(12) United States Patent
Xu et al.

(10) Patent No.: US 10,372,594 B2
(45) Date of Patent: Aug. 6, 2019

(54) METHOD AND DEVICE FOR RETRIEVING TEST CASE BASED ON CODE COVERAGE

(71) Applicant: EMC IP Holding Company LLC, Hopkinton, MA (US)

(72) Inventors: Bin Xu, Shanghai (CN); Yue Li, Shanghai (CN); Neil Yongjing Wang, Shanghai (CN); Sam Lei Sun, Shanghai (CN); Edward Zhibin Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/271,347

(22) Filed: Sep. 21, 2016

(65) Prior Publication Data

US 2017/0132119 A1    May 11, 2017

(30) Foreign Application Priority Data

Sep. 25, 2015 (CN) .......................... 2015 1 0622723

(51) Int. Cl.
*G06F 11/36* (2006.01)

(52) U.S. Cl.
CPC ........ *G06F 11/3688* (2013.01); *G06F 11/368* (2013.01); *G06F 11/3676* (2013.01); *G06F 11/3692* (2013.01)

(58) Field of Classification Search
CPC ............. G06F 11/3688; G06F 11/3676; G06F 11/368; G06F 11/3692
See application file for complete search history.

(56) References Cited

U.S. PATENT DOCUMENTS

| 9,037,595 | B2* | 5/2015 | Dangeville | ....... G06F 17/30864 |
| | | | | 707/756 |
| 2013/0111267 | A1* | 5/2013 | Beryoza | .............. G06F 11/3688 |
| | | | | 714/32 |
| 2016/0085663 | A1* | 3/2016 | Best | ..................... G06F 11/3684 |
| | | | | 714/38.1 |
| 2016/0217061 | A1* | 7/2016 | Fulton | ................. G06F 11/3688 |
| 2017/0046245 | A1* | 2/2017 | Liu | ........................ G06F 11/368 |

FOREIGN PATENT DOCUMENTS

| CN | 103034582 | 4/2013 |
| CN | 103176895 | 6/2013 |
| CN | 104657256 | 5/2015 |

* cited by examiner

*Primary Examiner* — Wei Y Zhen
*Assistant Examiner* — Amir Soltanzadeh
(74) *Attorney, Agent, or Firm* — BainwoodHuang

(57) ABSTRACT

Embodiments of the present invention relate to a method and a device for obtaining test cases based on a code coverage. The method comprises creating a mapping between source code and test cases based on a code coverage; and obtaining, in response to a change in the source code, the test cases for the change based on the mapping. The device comprises: a creating module configured to create a mapping between source code and test cases based on a code coverage; and an obtaining module configured to, in response to a change in the source code, obtain a test case for the change based on the mapping. Through such method and device, the embodiments of the present invention can obtain test cases as few as possible to cover the changed source code.

20 Claims, 23 Drawing Sheets

```
     24      [WebGet(UriTemplate = "")]
     25      public Class1 Function1()
  1  26      {
  1  27          return Class1.SayHello();
  1  28      }
     29
     30      [WebInvoke(UriTemplate = "", Method = "POST")]
     31      public Class1 Function2()
  0  32      {
  0  33          return Class1.SayGoodbye();
  0  34      }
     35
```

Fig.3

```
<Files>
    <File uid="1921" fullPath="File1"/>
    <File uid="1922" fullPath="File2"/>
</Files>
<Class>
    <FullName>Class1</FullName>
    <Methods>
      <Method visited="true">
         <Name>Class1::Function1()</Name>
         <FileRef uid="1922"/>
         <SequencePoints>
            <SequencePoint vc="1" uspid="45078" ordinal="0" offset="0" sl="26" fileid="1922"/>
            <SequencePoint vc="1" uspid="45079" ordinal="1" offset="1" sl="27" fileid="1922"/>
            <SequencePoint vc="1" uspid="45080" ordinal="2" offset="15" sl="28" fileid="1922"/>
         </SequencePoints>
      </Method>
      <Method visited="false">
         <Name>Class1::Function2()</Name>
         <FileRef uid="1922"/>
         <SequencePoints>
            <SequencePoint vc="0" uspid="45081" ordinal="0" offset="0" sl="32" fileid="1922"/>
            <SequencePoint vc="0" uspid="45082" ordinal="1" offset="1" sl="33" fileid="1922"/>
            <SequencePoint vc="0" uspid="45083" ordinal="2" offset="20" sl="34" fileid="1922"/>
         </SequencePoints>
      </Method>
    </Methods>
</Class>
```

Fig.4

```
1  class class1
2      def HelloWorld(welcome)
3          puts welcome
4          puts hello if welcome
5      end
6  end
```

Fig.5

```html
<div class="header">
    <h3>class1.rb</h3>
</div>
<pre>
 <ol>
    <li class="covered" data-hits="1" data-linenumber="1">
            <span class="hits">1</span>
            <code class="ruby">class class1</code>
    </li>
    <li class="covered" data-hits="1" data-linenumber="2">
            <span class="hits">1</span>
            <code class="ruby">def HelloWorld(welcome)</code>
    </li>
    <li class="covered" data-hits="1" data-linenumber="3">
            <span class="hits">1</span>
            <code class="ruby">   puts welcome</code>
    </li>
    <li class="missed" data-hits="1" data-linenumber="4">
            <span class="hits">1</span>
            <code class="ruby">   puts hello if welcome </code>
    </li>
    <li class="never" data-hits="" data-linenumber="5">
            <code class="ruby">end</code>
    </li>
    <li class="never" data-hits="" data-linenumber="6">
            <code class="ruby">end</code>
    </li>
 </ol>
</pre>
```

Fig.6

```
 1  class class1
 2  {
 3      public int Function1()
 4      {
 5          int i = 0;
 6          return i;
 7      }
 8
 9      public int Function2()
10      {
11          int j = 1;
12          return j;
13      }
14  }
15
16  class class2
17  {
18      public int Function3()
19      {
20          int p = 0;
21          return p;
22      }
23  }
```

Fig.11

```
class class1
{
    public int function1()
    {
        int i = 0;
        i ++;
        return i;
    } public int function2()
    {
        int j = 1;
        return j;
    }
}
```

```
1   class class1
2   {
3       public int Function1()
4       {
5           int i = 0;
6           return i;
7       }
8
9       public int Function3()
10      {
11          int z = 0;
12          return z;
13      }
14
15      public int Function2()
16      {
17          int j = 1;
18          return j;
19      }
20  }
21
```

```
8c9,14
---
>     public int Function3()
>     {
>         int z = 0;
>         return z;
>     }
>
```

Fig.17

```
1  class class1
2      def HelloWorld(welcome)
3          puts welcome
4          puts abc
5          puts hello if welcome
6      end
7  end
8
```

Fig.18

```xml
<linecomp status="same">
    <text ltid="1" rtid="1">class class1</text>
</linecomp>
<linecomp status="same">
    <text ltid="2" rtid="2">    def HelloWorld(welcome)</text>
</linecomp>
<linecomp status="same">
    <text ltid="3" rtid="3">        puts welcome</text>
</linecomp>
<linecomp status="rightorphan">
    <text rtid="4">        puts abc</text>
</linecomp>
<linecomp status="same">
    <text ltid="4" rtid="5">        puts hello if welcome</text>
</linecomp>
<linecomp status="same">
    <text ltid="5" rtid="6">    end        </text>
</linecomp>
<linecomp status="same">
    <text ltid="6" rtid="7">end</text>
</linecomp>
</filecomparison>
```

Fig.19

```
1   class class1
2       def HelloWorld(welcome)
3           puts welcome
4           puts hello if welcome
5       end
6       def HelloWorld1(welcome1)
7           puts welcome1
8           puts hello1 if welcome1
9       end
10  end
11
```

Fig.20

```
1  class class1
2      def HelloWorld(welcome)
3          puts welcome
4          puts hello if welcome
5      end
6      def HelloWorld2(welcome1)
7          puts welcome2
8          puts hello2 if welcome2
9      end
10     def HelloWorld1(welcome1)
11         puts welcome1
12         puts hello1 if welcome1
13     end
14 end
```

Fig.21

```
<linecomp status="same">
    <text ltid="1" rtid="1">class class1</text>
</linecomp>
<linecomp status="same">
    <text ltid="2" rtid="2">    def HelloWorld(welcome)</text>
</linecomp>
<linecomp status="same">
    <text ltid="3" rtid="3">        puts welcome</text>
</linecomp>
<linecomp status="same">
    <text ltid="4" rtid="4">        puts hello if welcome</text>
</linecomp>
<linecomp status="same">
    <text ltid="5" rtid="5">    end</text>
</linecomp>
<linecomp status="rightorphan">
    <text rtid="6"> def HelloWorld2(welcome1)</text>
</linecomp>
<linecomp status="rightorphan">
    <text rtid="7">    puts welcome2</text>
</linecomp>
<linecomp status="rightorphan">
    <text rtid="8">     puts hello2 if welcome2</text>
</linecomp>
<linecomp status="rightorphan">
    <text rtid="9"> end    </text>
</linecomp>
<linecomp status="same">
    <text ltid="6" rtid="10">    def HelloWorld1(welcome1)</text>
</linecomp>
<linecomp status="same">
    <text ltid="7" rtid="11">        puts welcome1</text>
</linecomp>
```

Fig.22

METHOD AND DEVICE FOR RETRIEVING TEST CASE BASED ON CODE COVERAGE

RELATED APPLICATION

This application claim priority from Chinese Patent Application Number CN201510622723.X, filed on Sep. 25, 2015 at the State Intellectual Property Office, China, titled "METHOD AND DEVICE FOR RETRIEVING TEST CASE BASED ON CODE COVERAGE," the contents of which is herein incorporated by reference in its entirety.

FIELD

Embodiments of the present invention relates to a software testing field, and more specifically relates to a method for obtaining a test case based on a code coverage.

BACKGROUND

Software testing refers to a process in which a program is operated in a specified condition to detect program errors, to measure software quality, and to evaluate whether it satisfies design requirements. Test cases are a group of test inputs, executing conditions and expected results complied for a certain particular purpose to test a certain program path or check whether a certain particular demand is satisfied.

In the software testing field, test cases are usually used to test source code. When a developer changes the source code (for example, adds, modifies or removes line in a function, or adds or removes a function in a class), a tester often has to run all test cases to cover the changed source code. However, if the source code is not changed that much, it is unnecessary to run all the test cases. If the source code is relatively complicated and/or there is relatively a large amount of test cases, it will be time-consuming and have a low efficiency due to necessity of running all test cases.

SUMMARY

A method, system, device, and computer program product for obtaining test cases based on a code coverage, the method, system, device and computer program product including creating a mapping between source code and test cases based on a code coverage and in response to a change in the source code, obtaining a test case for the change based on the mapping.

BRIEF DESCRIPTION

With reference to the figures, embodiments of the present invention are illustrated exemplarily, wherein:

FIG. 3 is an exemplary diagram of source code according to one embodiment of the present invention;

FIG. 4 is an exemplary diagram of generating a run report in an XML format after running test cases on source code in FIG. 3 using a code coverage tool;

FIG. 5 is an exemplary diagram of source code according to another one embodiment of the present invention;

FIG. 6 is an exemplary diagram of generating a run report in an HTML format after running test cases on source code in FIG. 5 using a code coverage tool;

FIG. 11 is an exemplary diagram of source code according to one embodiment of the present invention;

FIG. 12 is an exemplary diagram when a function of source code is changed in FIG. 11;

Figure 14:
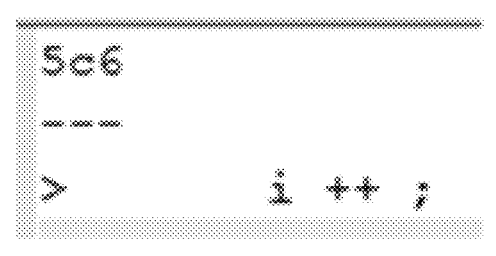

FIG. 14 is an exemplary diagram of exporting the change set in FIG. 13 as a text file using a comparing tool;

FIG. 15 is an exemplary diagram when a class of the source code in FIG. 11 is changed;

Figure 16:
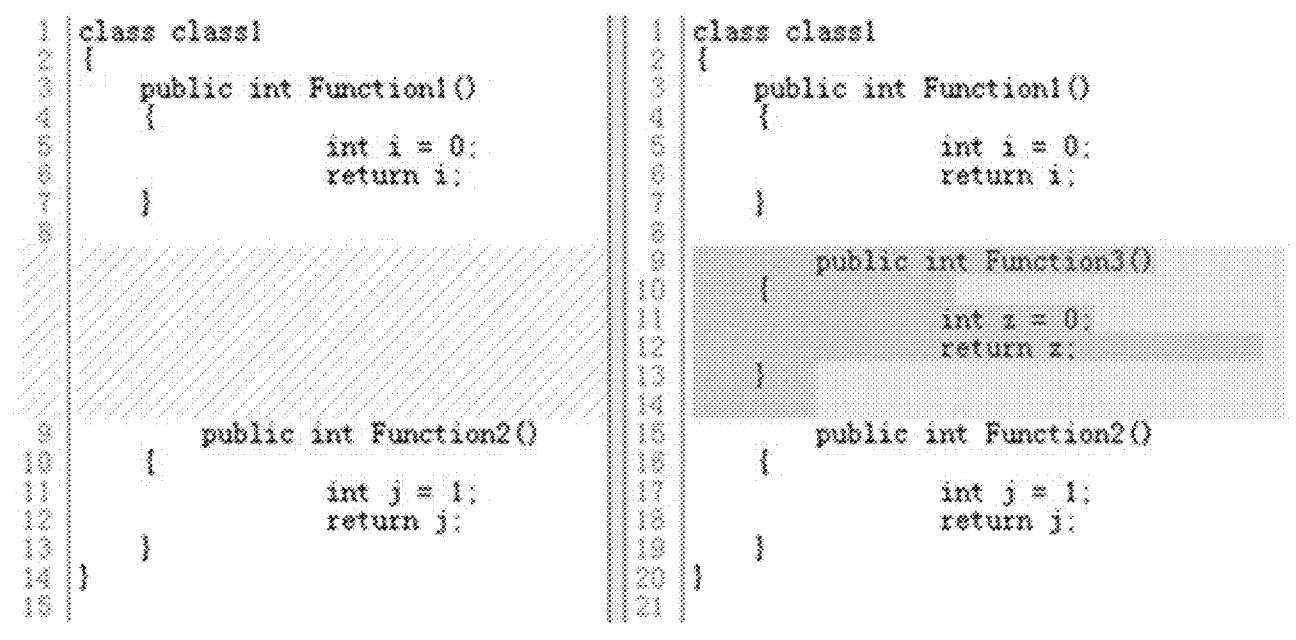

FIG. 16 is an exemplary diagram of a change set obtained after comparison of the code in FIG. 11 and FIG. 15 using a comparing tool;

FIG. 17 is an exemplary diagram of exporting the change set in FIG. 16 as a text file using a comparing tool;

FIG. 18 is an exemplary diagram when a function of the source code in FIG. 5 is changed;

FIG. 19 is an exemplary diagram of a change set obtained after comparison of the code in FIG. 5 and FIG. 18 using a comparing tool;

FIG. 20 is an exemplary diagram of source code according to another one embodiment of the present invention;

FIG. 21 is an exemplary diagram when a class of the source code in FIG. 20 is changed;

FIG. 22 is a schematic diagram of a change set obtained after comparison of the code in FIG. 20 and FIG. 21 using a comparing tool.

DETAILED DESCRIPTION

Figure 1:
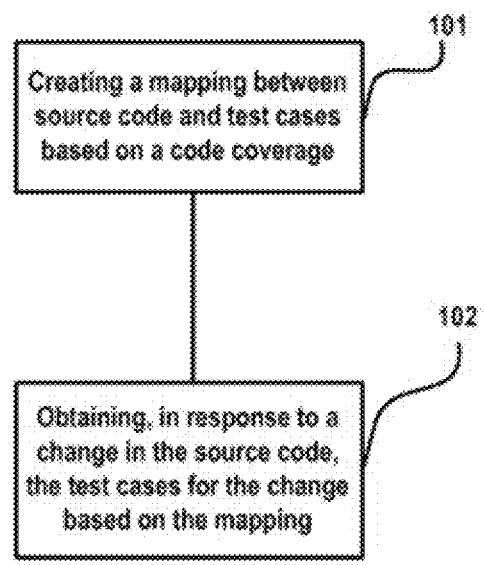
FIG. 1 is a schematic flowchart of a method of obtaining test cases based on a code coverage according to one embodiment of the present invention.

Hereinafter, embodiments of the present invention will be described with reference to the drawings. It should be noted that similar components or functional components may be represented by the same number. The appended drawings only intend to illustrate embodiments of the present invention. Those skilled in the art may obtain alternative embodiments from the following description without departing from the spirit and the protection scope of the present invention.

Embodiments of the present invention are new technical solutions proposed to solve the above mentioned technical problem, and the embodiments of the present invention may obtain test cases as few as possible to cover the changed source code.

In one aspect of the present invention, a method for obtaining test cases based on a code coverage is provided, comprising: creating a mapping between source code and test cases based on a code coverage; and in response to a change in the source code, obtaining a test case for the change based on the mapping.

According to one embodiment of the present invention, creating a mapping between source code and test cases based on a code coverage comprises: generating a run report after running the test cases on the source code using a code coverage tool; and obtaining a mapping between the source code and the test cases based on the run report.

According to one embodiment of the present invention, generating a run report after running the test cases on the source code using a code coverage tool comprises: after running each of the test cases on the source code, generating the run report for each of the test cases using the code coverage tool.

According to one embodiment of the present invention, obtaining a mapping between the source code and the test cases based on the run report comprises: creating, based on the run report, mapping tables between the test cases and line numbers, function names, class names and file names in the source code.

According to one embodiment of the present invention, creating the mapping tables comprises: performing information extraction on the run report generated after running each of the test cases to obtain a mapping table between each of the tests case and corresponding line numbers, function names, class names and file names in the source code.

According to one embodiment of the present invention, obtaining a mapping table between each of the test cases and corresponding line numbers, function names, class names and file names in the source code comprises: reading the run report to obtain the line numbers, function names, class names and file names of the source code; and storing each of the test cases and the obtained line numbers, function names, class names and file names into a mapping table of a database.

According to one embodiment of the present invention, creating mapping between source code and the test cases based on a code coverage comprises: performing test cases in a test case repository for the source code to obtain the code coverage.

According to one embodiment of the present invention, performing test cases in a test case repository for the source code to obtain the code coverage comprises: if the test cases in the test case repository fail to cover the source code, adding a new test case into the test case repository for an uncovered part of the source code.

According to one embodiment of the present invention, creating mapping between source code and the test cases based on a code coverage comprises: storing the mapping in a database modeled using a unitary modeling language (UML).

According to one embodiment of the present invention, obtaining test cases for the change based on the mapping comprises: obtaining a change set in response to a change in the source code.

According to one embodiment of the present invention, obtaining a change set in response to a change in the source code comprises: obtaining, using a comparing tool, the change set as compared to previously stored source code in response to the change in the source code.

According to one embodiment of the present invention, obtaining test cases for the change based on the mapping comprises: analyzing the change set to obtain test cases for the change.

According to one embodiment of the present invention, analyzing the change set to obtain test cases for the change comprises: obtaining a first test case mapped into a function based on the mapping in response to the change occurring in the function.

According to one embodiment of the present invention, obtaining a first test case mapped to a function based on the mapping in response to the change occurring in the function comprises: obtaining file names and line numbers based on the change set in response to the change in the source code; searching for a mapping table created between the source code and test cases using the file names and the line numbers to obtain the changed function names and class names; and searching for test case names simultaneously corresponding to the file names, the function names and the class names in the mapping table to obtain the first test case.

According to one embodiment of the present invention, analyzing the change set to obtain test cases for the change comprises: obtaining a second test case mapped into a class based on the mapping in response to the change occurring in the class.

According to one embodiment of the present invention, obtaining a second test case mapped into a class based on the mapping in response to the change occurring in the class comprises: obtaining file names and line numbers based on the change set in response to the change in the source code; searching for a mapping table created between the source code and test cases using the file names and the line numbers to obtain the changed class names; and searching for test case names simultaneously corresponding to the file names and the class names in the mapping table to obtain the second test case.

According to one embodiment of the present invention, it further comprises: running a union set between the first test case and the second test case.

In one aspect of the present invention, a device for obtaining test cases based on a code coverage is provided, comprising: a creating module configured to create a mapping between source code and test cases based on a code coverage; and an obtaining module configured to, in response to a change in the source code, obtain a test case for the change based on the mapping.

According to one embodiment of the present invention, the creating module comprises: a generating module configured to generate a run report after running the test cases on the source code using a code coverage tool; and an obtaining module configured to obtain mapping between the source code and the test cases based on the run report.

According to one embodiment of the present invention, the generating module configured to generate a run report after running the test cases on the source code using a code coverage tool comprises: a generating module configured to generate a run report for each of the test cases using the code coverage tool after running each of the test cases on the source code.

According to one embodiment of the present invention, the obtaining module configured to obtain mapping between the source code and the test cases based on the run report comprises: a creating module configured to create based on the run report a mapping table between the test cases and line numbers, function names, class names and file names in the source code.

According to one embodiment of the present invention, the creating module configured to create based on the run report a mapping table between the test cases and line numbers, class names, function names and file names in the source code comprises: a performing module configured to perform information extraction on a run report generated after running each of the test cases to obtain a mapping table between each of the test cases and corresponding line numbers, function names, class names and file names in the source code.

According to one embodiment of the present invention, the performing module configured to perform information extraction on a run report generated after running each of the test cases to obtain a mapping table between each of the test cases and corresponding line numbers, function names, class names and file names in the source code comprises: a reading module configured to read the run report to obtain the line numbers, function names, class names and file names of the source code; and a storing module configured to store each of the test cases and the obtained line numbers, function names, class names and file names into a mapping table of a database.

According to one embodiment of the present invention, the creating module comprises: an executing module configured to execute all test cases in a test case repository for the source code to obtain the code coverage.

According to one embodiment of the present invention, the executing module configured to execute all test cases in a test case repository for the source code to obtain the code coverage comprises: an adding module configured to, if the test cases in the test case repository fail to cover the source code, add a new test case into the test case repository for an uncovered part of the source code.

According to one embodiment of the present invention, the creating module comprises: a storing module configured to store the mapping in a database modeled using a unitary modeling language.

According to one embodiment of the present invention, the obtaining module comprises: an obtaining module configured to obtain a change set in response to a change in the source code.

According to one embodiment of the present invention, the obtaining module configured to obtain a change set in response to a change in the source code comprises: an obtaining module configured to obtain, using a comparing tool, the change set as compared to previously stored source code in response to the change in the source code.

According to one embodiment of the present invention, the obtaining module comprises: an analyzing module configured to analyze the change set to obtain test cases for the change.

According to one embodiment of the present invention, wherein the analyzing module configured to analyze the change set to obtain test cases for the change comprises: an obtaining module configured to obtain a first test case mapped into a function in response to the change occurring in the function.

According to one embodiment of the present invention, the obtaining module configured to obtain a first test case mapped into a function in response to the change occurring in the function comprises: an obtaining module configured to obtain file numbers and line numbers based on the change set in response to a change in the source code; a searching module configured to search for a mapping table created between the source code and test cases using the file numbers and the line numbers to obtain the changed function names and class names; and a searching module configured to search for test case names simultaneously corresponding to the file names, the function names and the class names in the mapping table to obtain the first test case.

According to one embodiment of the present invention, the analyzing module configured to analyze the change set to obtain test cases for the change comprises: an obtaining module configured to obtain a second test case mapped into a class based on the mapping in response to the change occurring in the class.

According to one embodiment of the present invention, the obtaining module configured to obtain a second test case mapped into a class based on the mapping in response to the change occurring in the class comprises: an obtaining module configured to obtain file numbers and line numbers based on the change set in response to a change in the source code; a searching module configured to search for a mapping table created between the source code and test cases using the file numbers and the line numbers to obtain the changed class names; and a searching module configured to search for test case names simultaneously corresponding to the file names and the class names in the mapping table to obtain the second test case.

According to one embodiment of the present invention, it further comprises: a running module configured to run a union set between the first test case and the second test case.

In one aspect of the present invention, a computer program product is provided, comprising a computer readable program instruction embodied therein, which causes a processor to execute the above mentioned method when the computer readable program instruction is being executed by the processor.

In the embodiments of the present invention, as mapping between source code and test cases may be created based on the code coverage, test cases for the change may be obtained based on the mapping in response to a change in the source code, without the need of running all test cases for entire source code. By only obtaining corresponding test cases for the change of the source code, the test cases can be obtained as few as possible to cover the changed source code.

FIG. 1 illustrates a schematic flowchart of a method of obtaining test cases based on a code coverage according to one embodiment of the present invention. At step 101, mapping between source code and test cases is created based on a code coverage. At step 102, in response to a change in the source code, the test cases for the change are obtained based on the mapping.

For example, the mapping between the source code and the test cases may be created based on the code coverage, and therefore, in response to a change in the source code, test cases for the change can be obtained based on the mapping, without a need of running all the test cases for entire source code. Accordingly, by only obtaining corresponding test cases for the change of the source code, the test cases can be obtained as few as possible to cover the changed source code.

Figure 2:
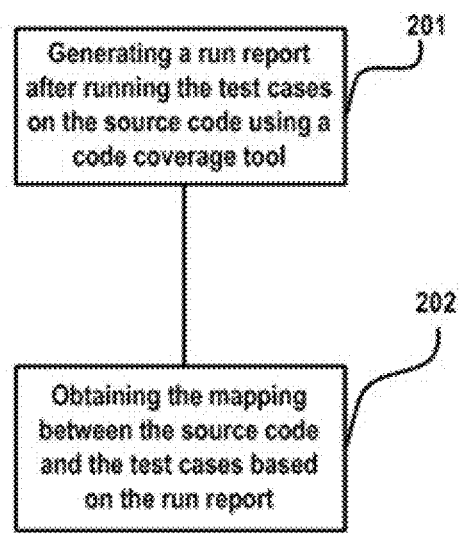
FIG. 2 is a schematic flowchart of creating mapping between source code and test cases based on the code coverage according to one embodiment of the present invention.

FIG. 2 illustrates a schematic flowchart of creating mapping between source code and test cases based on the code coverage according to one embodiment of the present invention. At step 201, a run report after running the test case on the source code is generated using a code coverage tool. At step 202, mapping between the source code and the test case is obtained based on the run report.

For instance, the code coverage tool may be an opencover tool or a simplecov tool, etc. For example, the run report may be a run report in an XML (an extensible markup language) format generated by using the opencover tool, or may be a run report in an HTML (a hypertext markup language) generated by using the simplegov tool.

For instance, FIG. 4 exemplarily illustrates generation of a run report in an XML format after running test cases on source code in FIG. 3. Wherein, the source code as shown in FIG. 3 illustrates examples of code from Line 24 to Line 35.

For instance, FIG. 6 exemplarily illustrates generation of a run report in an HTML format after running test cases on source code in FIG. 5. Wherein, the source code as shown in FIG. 5 illustrates examples of code from Line 1 to Line 6.

According to one embodiment of the present invention, the step of generating the run report after running test cases on source code using a code coverage tool comprises: generating a run report for each of the test cases using the code coverage tool after running each of the test cases on the source code.

For example, regarding each of the test cases, each of the test cases is run on the source code, and then the run report of each of the test cases is generated using a code coverage tool to facilitate the subsequent creation of the mapping between the source code and the test case based on the run report. Therefore, after running all the test cases, mapping between all the test cases and the source code may be created.

According to one embodiment of the present invention, the step of obtaining the mapping between the source code and the test cases based on the run report comprises: creating a mapping table between the test cases and line numbers, function names, class names and file names in the source code based on the run report.

For example, suppose that FIG. 4 illustrates a report in an XML format generated after running an $M^{th}$ test case Testcase M (for instance, M=1, i.e., the case name is the test case 1 (Testcase1)) on the source code shown in FIG. 3, wherein it can be obtained based on the report that the class name covered by the $M^{th}$ test case includes ClassN, in which N=1, namely "Class 1" is covered; the function (also called a method) name covered by the $M^{th}$ test case includes FunctionP, in which P=1, namely Function1 is covered. Additionally, a vc value represents access times, an s1 value represents a corresponding line number, and a fileid value corresponds to a uid (a unique identifier) of the file, i.e., the file name covered by the test case includes FileQ, in which Q=2, i.e., File2 is covered. At this time, by analyzing the report in the XML report (for example, report.xml), the mapping between the $M^{th}$ test case (it is the test case 1 in the example) and the source code (namely line numbers, function names, class names and file names) can be obtained.

For instance, suppose that FIG. 6 illustrates a report in an HTML format generated after running the $M^{th}$ test case on the source code as shown in FIG. 5 (for example, M'=1, i.e., the test case name is Testcase1), wherein Covered represents that the line is covered, Missed represents that the line is not covered, Never represents a blank line, an explanatory note, an end keyword, etc., and data-linenumber represents a line number. h3 in Div is a file name, def in the value of <code> represents a function name (such as Hello World), class represents a class name (such as class 1), and class and method are both ended with "end". At this time, by analyzing the report in the HTML format (e.g., report.html), the mapping between the $M^{th}$ test case (it is the test case 1 in the example) and the source code (namely line numbers, function names, class names and file names) can be obtained.

According to one embodiment of the present invention, the step of creating, based on the run report, the mapping between the test cases and line numbers, function names, class names and file names in the source code comprises: performing information extraction on the run report generated after running each of the test cases to obtain a mapping table between each of the test cases and the corresponding line numbers, function names, class names and file names in the source code.

For instance, as shown in FIGS. 4 and 6, the run report generally includes the line numbers, the function names, the class names and the file names covered by the running test cases, and thereupon, by performing information extraction on such run report, the mapping between each of the test cases and the corresponding line numbers, function names, class names and file names in the source code, e.g., a mapping table (which may be stored in the database) could be obtained. Subsequent to running all the test cases, the mapping between all test cases and the corresponding line numbers, function names, class names and file names in the source code (e.g., a mapping table) could be obtained.

According to one embodiment of the present invention, the step of performing information extraction on the run report generated after running each of the test cases, to obtain the mapping table between each of the test cases and the corresponding line numbers, function names, class names and file names in the source code comprises: reading the run report to obtain line numbers, function names, class names and file names in the source code; and storing the obtained line numbers, function names, class names and file names into the mapping table of the database.

For instance, the step of obtaining the mapping table between the Testcase1 and the source code based on the report in the XML format in FIG. 4 may be realized through the following:
1. reading report.xml to obtain a root node
XElement root=XElement.Parse ("report.xml");
2. obtaining corresponding relation between the file name and uid using the root node, storing it in an object htFileObj (to be used later)
for example, regarding the following report portion in FIG. 4:

```
<Files>
    <File uid="1921" fullPath"File1" />
    <File uid="1922" fullPath="File2" />
</Files>
``` the corresponding relation between the file name and uid may be obtained using the following pseudocode:

```
foreach (XElement file in root.Element("Files").Elements("File"))
{
    obtaining a value of uid, e.g., 1922
    string uid = file.Attribute("uid");
    obtaining a value of fullpath, e.g., File2
    string fullPath = file.Attribute("fullPath");
    then, storing uid and fullPath in the file name object hashtable (e.g.,
htFileObj), which will be used in the later process:
        saveToObj(uid, fullPath), e.g., 1922 corresponding to File2
}
```

3. obtaining a name of the class (i.e., class name) using the root node, which will be used in the later process:
for example, regarding the following report portion in FIG. 4:
<Class>
    <FullName>Class1</FullName> the following pseudocode may be used to obtain the class name (e.g., Class1):
className=root.Element("Class").Element("FullName").value
4. traversing the function in the class to obtain the function name, the line number, fileid, etc., and storing the test case name (e.g., testcase 1), the line number, the function name, the class name and the file name into the database
for instance, regarding the function (method) in FIG. 4 the following pseudocode may be used to obtain the function name, the line number, fileid, etc.:

```
foreach (XElement method in
root.Element("Class").Element("Methods").Elements("Method"))
{
obtaining the function name, e.g., Function1
    methodName = method.Element("Name").value
    traversing circularly SequencePoints
    foreach (XElement sequencePoint in
Method.Element("SequencePoints").Elements("SequencePoint"))
    {
        obtaining a vc value, e.g., 1
        string vc = sequencePoint.Attribute("vc");
        obtaining an sl value, e.g., 26
        string sl = sequencePoint.Attribute("sl");
        obtaining a fileid value, e.g., 1922
        string fileid = sequencePoint.Attribute("fileid");
        wherein the fileid value (e.g., 1922) is the uid stored in
htFileObj at step 2, the fullPath value (e.g., File2) is obtained based on the
fileid value, and then a value is assigned to the filename
        if (vc.equals("1"))
        {
        if the attribute vc of sequencePoint is 1, which means testcase
        covers the source code, the testcase, the line number, the
function name, the class name and the file name are stored into the
database
        for instance, "testcase1, 26, Function1, Class1, File2" is stored
        in the database
        saveToDB(testcase, sl, methodName, className, filename)
        }
        else
        {
        otherwise,
        only the line number, the function name, the class name, the file
name are stored in the database (note: no testcase)
        for instance, "32, Function2, Class1, File2" is stored in the
        database saveToDB(sl, methodName, className, filename)
        }
    }
}
``` the mapping (e.g., a mapping table) between the test case 1 and the source code created through the above process, for example, may be presented in a form of Table 1:

TABLE 1

| Test Case name (TestcaseM) | Line number (s1) | Function name (FunctionP) | Class name (ClassN) | File name (FileQ) |
|---|---|---|---|---|
| Testcase1 | 26 | Function1 | Class1 | File2 |
| Testcase1 | 27 | Function1 | Class1 | File2 |
| Testcase1 | 28 | Function1 | Class1 | File2 |
|  | 32 | Function2 | Class1 | File2 |
|  | 33 | Function2 | Class1 | File2 |
|  | 34 | Function2 | Class1 | File2 |

In Table 1, Testcase1 is vacant due to not covering line numbers 32, 33, 34. As seen from the report in the foregoing XML format, code with line number 26-28 is covered and code with number lines 32-34 is not covered by Testcase1 when running the Testcase1, wherein the code with line numbers 26-28 corresponding to the function name Function1, the class name Class1, and the file name File2.

Furthermore, though Testcase1 does not cover line numbers 32, 33, 34, it can be seen from the report in the above mentioned XML format that the source code with line numbers 32-34 corresponds to the function name Function2, the class name Class1 and the file number File2, and at this time, such corresponding relation may be stored in the mapping table. When each of the test cases is run for the source code (for instance, M test cases are run, and the case names are Testcase1, Testcase2 . . . TestcaseM), the mapping (for instance, a mapping table corresponding to the line number s1, the function name FunctionP, the class name ClassN and the file number FileQ) can be created in each of the test cases, and at this time when running all the test cases is completed, corresponding mapping (e.g., a mapping table) can be created between all test cases and the source code.

According to one embodiment of the present invention, creating mapping between the source code and the test cases based on the code coverage comprises: for the source code, executing all test cases in the test case repository to obtain the code coverage.

Figure 7:
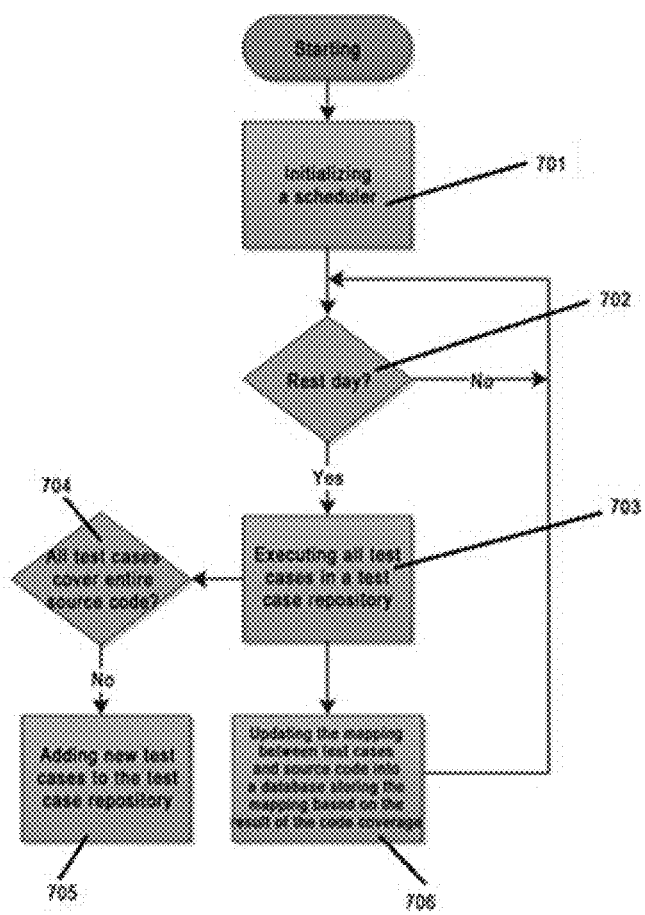
FIG. 7 is a schematic flowchart of creating mapping between source code and test cases based on the code coverage according to another one embodiment of the present invention.

For instance, at step 703 in FIG. 7, all test cases stored in the test case repository are run to obtain the code coverage for the source code. For example, every time when one test case is run, a code coverage result (e.g., a run report) corresponding to the test case is obtained, then the result is firstly stored. All of the code coverage results corresponding to all test cases are obtained until completing running all the code coverage results, and these stored code coverage results may be used in the following step 706 in FIG. 7 to create mapping between the source code and test cases, and the established mapping is stored in the database.

For instance, step 702 may be designed prior to step 703 in FIG. 7, wherein it is determined at step 702 whether it is a rest day: if it is a rest day, step 703 is performed to run all the test cases; if it is not a rest day, advent of the rest day is waited; that is, the mapping between the source code and the test cases is created based on the code coverage on a rest day. It is because the process of running test cases is time-consuming, especially in the case that there is much source code and many test cases, and running at a work day would affect normal development of the source code. Accordingly, the rest day is selected and creating the mapping is completed at free time.

For instance, step 707 may be designed prior to step 702, wherein a scheduler is initialized at step 701, so as to facilitate scheduling, e.g., thread execution of the running process of the test cases.

According to one embodiment of the present invention, the step of executing, for the source code, all test cases in a test case repository to obtain the code coverage comprises: adding new test cases for uncovered source code into the test case repository when all test cases do not cover entire source code.

For instance, at step 704 of FIG. 7, it is determined whether all test cases cover entire source code, and if not, new test cases are required (e.g., on a work day) to be added into the test case repository at step 705 of FIG. 7 to facilitate the subsequent creation of a more comprehensive mapping between the source code and the test cases. However, it should be understood that, even though the mapping between the source code and the test cases is not comprehensive (or not perfect), the available test cases can be still obtained using the created mapping and this does not affect implement of the present invention. For example, query is performed in the created mapping table to obtain the corresponding test cases for the change of the source code.

According to one embodiment of the present invention, the step of creating mapping between the source code and the test cases based on the code coverage comprises: storing the mapping into a database modeled using a unitary modeling language. The database is only used exemplarily but not restrictively.

Figure 8:
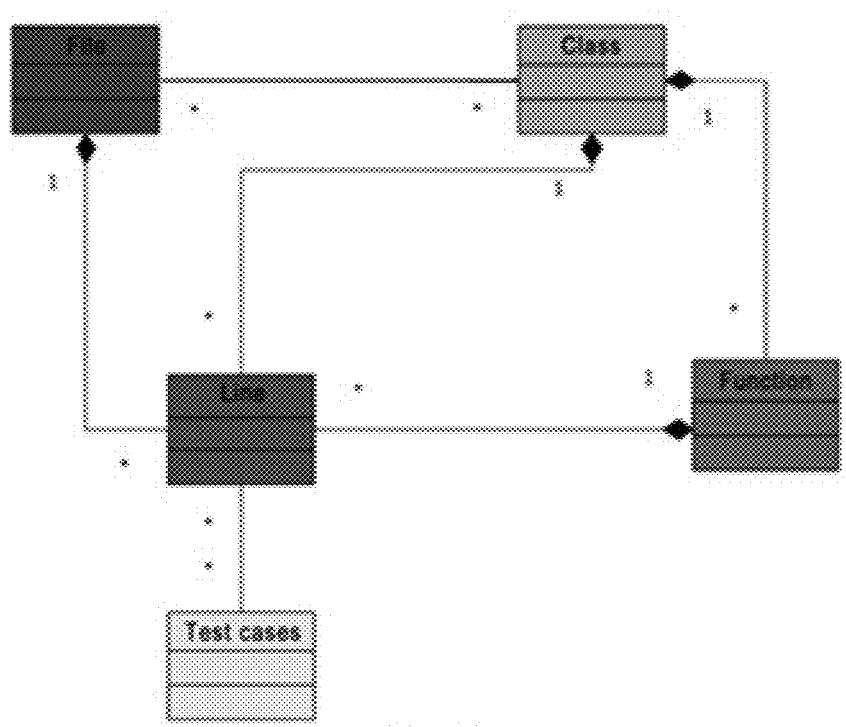
FIG. 8 is a diagram of storing the created mapping into a database modeled using a unitary modeling language, according to one embodiment of the present invention.

For instance, FIG. 8 is a diagram of storing the created mapping into a database modeled using a unitary modeling language, wherein "1" represents 1 in the corresponding relation, "*" represents multiple in the corresponding relation. For example, "Line" and "Testcase" are in a multiple-to-multiple corresponding relation; "Line" and "File" are in a multiple-to-one corresponding relation; "Line" and "Class" are in a multiple-to-one corresponding relation; "Line" and "Function" are in a multiple-to-one corresponding relation; "File" and "Class" are in a multiple-to-multiple relation; and "Function" and "Class" are in a multiple-to-one corresponding relation. Through such relation, the mapping between the source code and the test cases created based on the code coverage may be stored in the database.

For instance, the step of storing the mapping in the database modeled using a unitary modeling language comprises: based on a code coverage result, updating the mapping between the test cases and the source code into the database storing the mapping. For example, at step 706 of FIG. 7, updating the database may be in a manner as follows: firstly, clearing database updated at the previous rest day (such as the database storing the mapping between all the test cases and the source code), then creating the mapping between the corresponding test case and the source code based on the code coverage results corresponding to all the test cases stored at step 703 of FIG. 7, and storing the created mapping into the database. For example, the code coverage result corresponding to each of the test cases may be analyzed to create a mapping table between the test case and the source code, and then the created relation table is stored into the database; and after the code coverage results corresponding to all the test cases are analyzed, the database storing the mapping table between all the test cases and the source code on the present rest day can be obtained.

Figure 9:
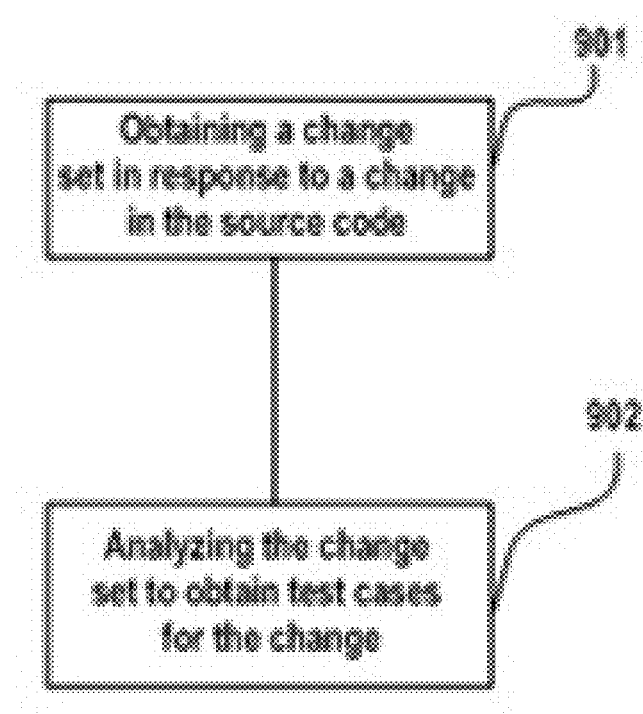
FIG. 9 is a diagram of obtaining, in response to a change in the source code, test cases for the change based on the mapping, according to one embodiment of the present invention.

Continuing to refer to FIG. 1, subsequent to the step of creating mapping at step 101, test cases for the change may be obtained based on the mapping at step 102. FIG. 9 is a schematic flowchart of obtaining test cases for the change based on the mapping; and FIG. 10 is a schematic flowchart of obtaining test cases for the change based on the mapping.

According to one embodiment of the present invention, the step of obtaining the test cases for the change based on the mapping comprises: obtaining a change set in response to a change in the source code (step 901 shown in FIG. 9).

Figure 10:
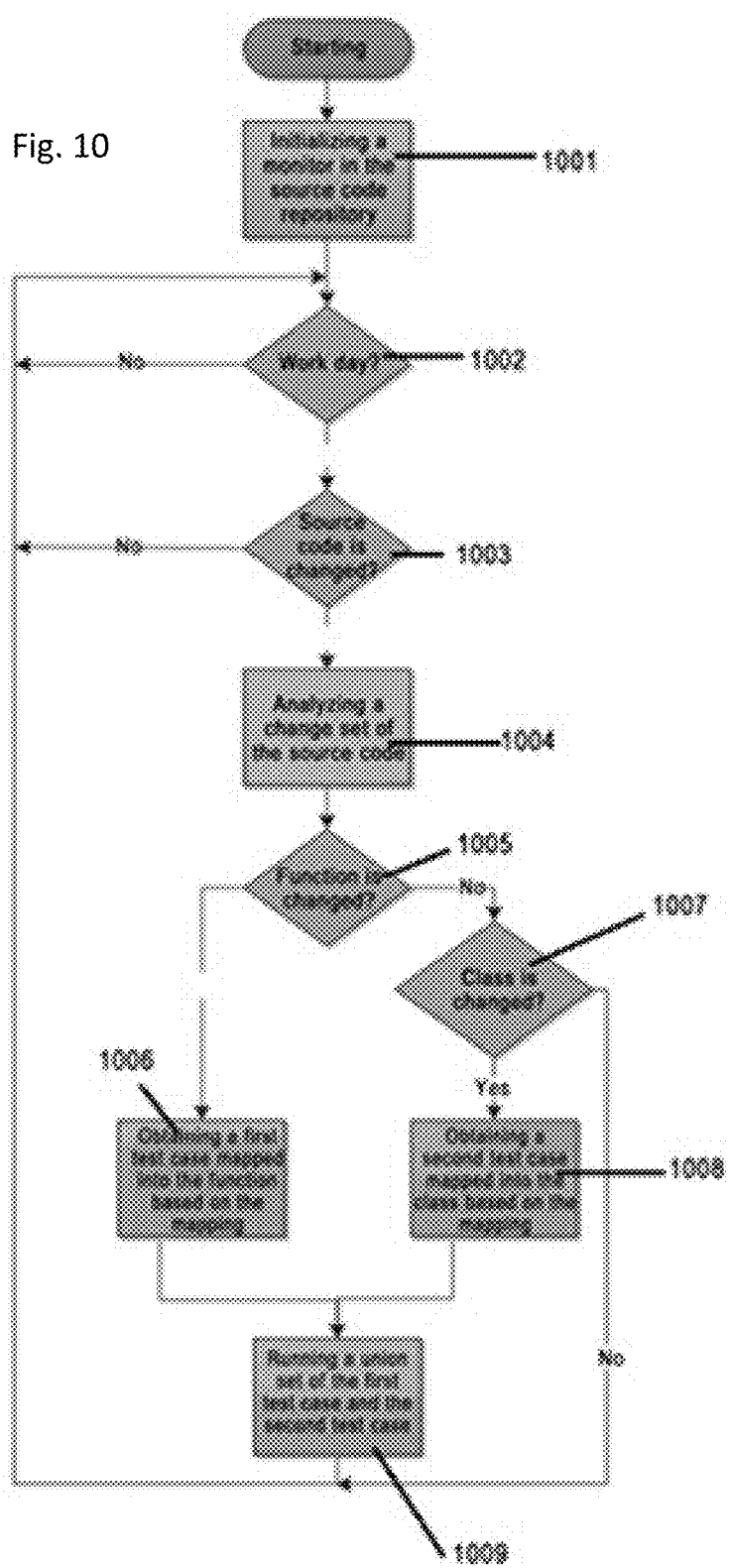
FIG. 10 is a diagram of obtaining, in response to a change in the source code, test cases for the change based on the mapping, according to one embodiment of the present invention.

For instance, at step 1003 of FIG. 10, it is determined whether there is a change in the source code, and in response to a change in the source code (often occurs in the development of the source code), for example, when the source code is modified correspondingly, such change information may be obtained, for example, using the corresponding comparing tool, the change set is obtained in response to a change in the source code.

For instance, step 1002 is designed prior to step 1003 of FIG. 10, and it is determined whether it is a work day in step 1002. If it is a work day, then judging whether there is a change in the source code and obtaining the corresponding change set; and if it is not a work day, then the source code is generally not changed and advent of the work day is waited. As code development is generally performed at work days, such determination may improve operating efficiency of the method in the present invention and save resources and costs.

For instance, step 1001 is designed prior to step 1002 of FIG. 10, and at step 1001, a monitor in a source code repository is initialized and the source code repository stores the source code. By initializing the monitor in the source code repository, real-time monitoring of the source code may be performed.

According to one embodiment of the present invention, the step of obtaining a change set in response to a change in the source code comprises: obtaining, using a comparing tool, a change set as compared to the previously stored source code in response to a change in the source code.

For instance, a comparing tool (such as a DiffMerge tool or a Beyond Compare tool) is used for comparison to obtain a change set between the current version of the source code and the previous version of the source code stored in the database, and such change set is exported to, for example, a text file or an XML file, and then the text file or the XML file is analyzed to facilitate the subsequent obtaining of the corresponding test case to be run.

According to one embodiment of the present invention, the step of obtaining test cases for the change based on the mapping comprises: analyzing the change set to obtain test cases for the change (step 902 as shown in FIG. 9).

For example, at step 1004 of FIG. 10, the change set may be analyzed to obtain that the change of the source code occurs in the function and/or the class, thereby pertinently obtaining the corresponding test cases.

According to one embodiment of the present invention, the step of analyzing the change set to obtain test cases for the change comprises: obtaining a first test case mapped to a function based on the mapping, in response to the change occurring in the function.

For instance, a change in the function comprises at least one of the following in the function: adding lines, modifying lines and deleting lines. For example, at step 1005 of FIG. 10, judging whether the change of the source code occurs in the function may be performed. If yes, step 1006 is performed for obtaining the first test case mapped into the function; and if no, step 1007 is performed.

According to one embodiment of the present invention, the step of obtaining a first test case mapped to a function based on the mapping in response to the change occurring in the function comprises: obtaining changed file names and line numbers of the source code based on the change set; searching for a mapping table created between the source code and test cases using the file names and the line numbers to obtain changed function names and class names; searching for case names simultaneously corresponding to the file names, the function names and the class names in the mapping table to obtain the first test case.

First Example of Obtaining the First Test Case

Assuming that the previous source code (for example, stored in File1) is in a form of FIG. 11, four test cases (Testcase1, Testcase2, Testcase3 and Testcase4) are run for the source code, and a mapping table created between the four test cases and the source code may for example be presented in a form of the following Table 2:

TABLE 2

| Test Case name | Line number | Function name | Class name | File name |
| --- | --- | --- | --- | --- |
| Testcase1 | 4 | Function1 | class1 | File1 |
| Testcase1 | 5 | Function1 | class1 | File1 |
| Testcase1 | 6 | Function1 | class1 | File1 |
| Testcase1 | 7 | Function1 | class1 | File1 |
| Testcase2 | 4 | Function1 | class1 | File1 |
| Testcase2 | 5 | Function1 | class1 | File1 |
| Testcase2 | 6 | Function1 | class1 | File1 |
| Testcase2 | 7 | Function1 | class1 | File1 |
| Testcase3 | 10 | Function2 | class1 | File1 |
| Testcase3 | 11 | Function2 | class1 | File1 |
| Testcase3 | 12 | Function2 | class1 | File1 |
| Testcase3 | 13 | Function2 | class1 | File1 |
| Testcase4 | 19 | Function5 | class2 | File1 |
| Testcase4 | 20 | Function5 | class2 | File1 |
| Testcase4 | 21 | Function5 | class2 | File1 |
| Testcase4 | 22 | Function5 | class2 | File1 |

Figure 13:
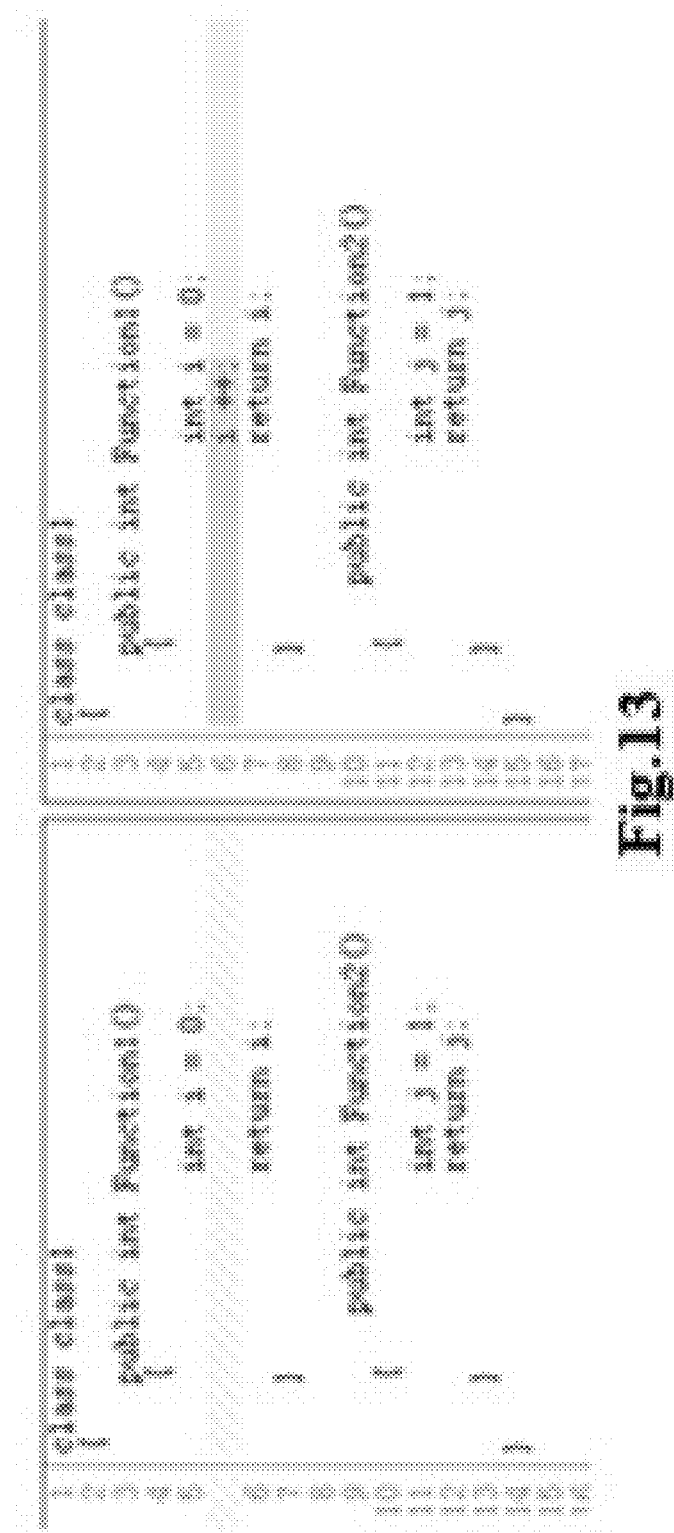
FIG. 13 is an exemplary diagram of a change set obtained after comparison of the code in FIG. 11 and FIG. 12 using a comparing tool.

If source code of class1 in FIG. 11 is a form of FIG. 12, i.e., a line of code i++ is added in the Function1, the first test case may be obtained using the following process:

1. obtaining a change set using a comparing tool (e.g., a DiffMerge tool) (as shown in FIG. 13), and exporting the change set to, for example, a test file (as shown in FIG. 14);

2. by analysis of the text file, obtaining that a change occurs in latter code of line 5 (i.e., LineNumber=5) of File1 (i.e., FileName=File1), i.e., a line of code i++ is added;

3. searching for a corresponding record (which can be obtained in this example) in the mapping presented in Table 2 using LineNumber=5, FileName=File1, thereby obtaining that the changed code has the function name Function1 and the class name class1; and 4. obtaining, in Table 2, test case names simultaneously corresponding to the file name File1, the function name Function1 and the class name class1, wherein it is obtained in the example through Table 2 that test cases corresponding to the code change are Testcase1 and Testcase2 (i.e., the first test case).

Testcase1 and Testcase2 herein are the first test case, and the corresponding test for the change of the source code (in the example, the function is changed) is performed by running the two test cases, instead of running all the test cases (e.g., Testcase1, Testcase2, Testcase3 and Testcase4 in Table 2), thereby improving the test efficiency, i.e., test cases may be obtained as few as possible to cover the changed source code.

Second Example of Obtaining the First Test Case

Like in the first example, assume that the previous source code (for example, stored in File1) is in a form of FIG. 5 and a corresponding mapping table is created (omitted herein), and if the source code in FIG. 5 is changed in a form of FIG. 18, i.e., a line puts abc is added into the function Hello World, then the first test case can be obtained using the following process:

1. obtaining a change set using a comparing tool (e.g., a Beyond Compare tool), and exporting the change set to, for example, the XML file, as shown in FIG. 19;

2. by analysis of the document file, obtaining that: "puts abc" is added in line 4 of File1 (i.e., FileName=File1) in the current source code (as shown in the block of FIG. 19);

3. searching for a corresponding record in a created mapping table using LineNumber=4, FileName=File1, thereby obtaining a function name (Hello World) and a class name (class1) of the changed code; and 4. obtaining test cases simultaneously corresponding to the file name File1, the function name Hello World and the class name class1 in the created mapping table, i.e., the first test case.

According to one embodiment of the present invention, the step of analyzing the change set to obtain test cases for the change comprises: obtaining a second test case mapped into a class based on the mapping in response to the change occurring in the class.

For instance, the change in the class comprises adding and/or removing the function in the class. For example, judging whether the change of the source code occurs in a class may be performed at step 1007 of FIG. 10, and if yes, step 1008 is performed to obtain a second test case mapped to the class. For example, at step 1007 of FIG. 10, judging whether a function is changed is performed firstly, judging whether the change of the source code occurs in the class is then performed after determining that the change of the code does not occur in the function, and if yes, step 1008 is performed to obtain the second test case mapped to the class.

According to one embodiment of the present disclosure, the step of obtaining a second test case mapped to a class based on the mapping in response to the change occurring in the class comprises: obtaining changed file names and line numbers of the source code based on the change set; searching for a mapping table created between the source code and test cases using the file names and the line numbers to obtain changed class names; and searching for case names simultaneously corresponding to the file names and the class names in the mapping table to obtain the second test case.

First Example of Obtaining the Second Test Case

Continuing the above mentioned example of the source code of FIG. 11, if the source code of the current class1 is in a form of FIG. 15, i.e., a function Function3 is added to the class1, a second test case may be obtained through the following process:

1. obtaining a change set (as shown in FIG. 16) using a comparing tool (such as a DiffMerge tool), and exporting the change set to, for example, a test file (as shown in FIG. 17);

2. by analysis of the text file, obtaining that: in the current source code, a function with a function name Function3 is added to the latter part in line 8 (i.e., LineNumber=8) of File1 (i.e., FileName=File1) (but the functions Function1 and Function2 are not changed as a matter of fact);

3. searching for a corresponding record in the mapping in Table 2 as shown above using LineNumber=8, FileName=File1 to obtain the changed class name of the code (not found in the example); as it is not found in the example, obtaining the class name, for example, through the following manner that the line 8 of File1 (FileName=File1) starts from line 4 and ends at line 13 in class1 of File1 (i.e., as can be obtained through searching in Table 2), and obtaining that the changed class name of the code is class1; and 4. obtaining, in Table 2, case names simultaneously corresponding to the file name File1 and the class name class1, wherein the test cases corresponding to the code change are Testcase1, Testcase2 and Testcase3 (i.e., the second test case), which can be obtained through Table 2 in the example.

If the obtained second test case is run herein, the corresponding test may be performed for the change of the source code (in the example, the class is changed), without the need of running all the test cases (e.g., Testcase1, Testcase2, Testcase3 and Testcase4 in Table 2), thereby improving the test efficiency, i.e., the test cases may be obtained as few as possible to cover the changed source code.

Second Example of Obtaining the Second Test Case

Like in the first example, assume that the previous source code (for example, stored in File1) is in a form of FIG. 20 and a corresponding mapping table is created (omitted herein). If the source code in FIG. 20 is changed into the form of FIG. 21, i.e. a function Hello World2 is added to class1, the second test case may be obtained through the following process:

1. obtaining a change set using a comparing tool (e.g. a Beyond Compare tool) and exporting the change set to, for example, the XML file, as shown in FIG. 22;
2. by analysis of the XML file, obtaining that: in the current source code, a function "Hello World2" is added to lines 6-9 of File1 (i.e., FileName=File1) (as shown in a block of FIG. 22);
3. searching for a corresponding record in the created mapping table using LineNumber=6, FileName=File1, thereby obtaining a changed class name (class1) of the code; and
4. obtaining case names simultaneously corresponding to the file name File1 and the class name class1 in the created mapping table, i.e., a second test case.

According to one embodiment of the present invention, it further comprises: running a union set between the first test case and the second test case.

For instance, at step 1009 of FIG. 10, a first test case obtained for the change of the function and a second test case obtained for the change of the function are combined, and then the test cases in the union set are run on the source code, thereby covering all the changes of the source code and improving the efficiency of the software test, i.e., the test cases may be obtained as few as possible to cover the changed source code.

Figure 23:
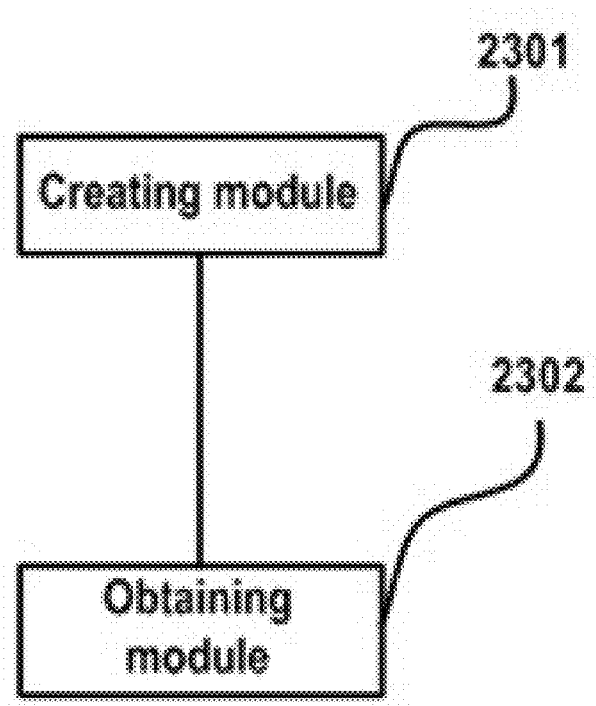
FIG. 23 is a structural diagram of a device for obtaining test cases based on a code coverage according to one embodiment of the present invention.

As shown in FIG. 23, the embodiment of the present invention further provides a device for obtaining test cases based on a code coverage, comprising: a creating module 2301 configured to create mapping between source code and test cases; and an obtaining module 2302 configured to, in response to a change in the source code, obtain a test case for the change based on the mapping.

According to one embodiment of the present invention, creating module 2301 comprises: a generating module configured to generate a run report generated after running the test cases on the source code using a code coverage tool; and an obtaining module configured to obtain mapping between the source code and the test cases based on the run report.

According to one embodiment of the present invention, the generating module configured to generate a run report after running the test cases on the source code using a code coverage tool comprises: a generating module configured to generate a run report for each of the test cases using the code coverage tool after running each of the test cases on the source code.

According to one embodiment, the obtaining module configured to obtain mapping between the source code and the test cases based on the run report comprises: a creating module configured to create based on the run report a mapping table between the test cases and line numbers, function names, class names and file names in the source code.

According to one embodiment of the present invention, the creating module configured to create based on the run report a mapping table between the test cases and line numbers, function names, class names and file names in the source code comprises: a performing module configured to perform information extraction on a run report generated after running each of the test cases to obtain a mapping table between each of the test cases and corresponding line numbers, function names, class names and file names in the source code.

According to one embodiment of the present invention, the performing module configured to perform information extraction on the run report generated after running each of the test cases to obtain a mapping table between each of the test cases and corresponding line numbers, function names, class names and file names in the source code comprises: a reading module configured to read the run report to obtain the line numbers, function names, class names and file names of the source code; and a storing configured to store each of the test cases and the obtained line numbers, function names, class names and file names into a mapping table of a database.

According to one embodiment of the present invention, the creating module 2301 comprises: an executing module configured to execute for the source code all test cases in a test case repository to obtain the code coverage.

According to one embodiment of the present invention, the executing module configured to execute for the source code all test cases in a test case repository to obtain the code coverage comprises: an adding module configured to, if the test cases in the test case repository fail to cover the source code, add a new test case into the test case repository for an uncovered part of the source code.

According to one embodiment of the present invention, the creating module 2301 comprises: a storing module configured to store the mapping in a database modeled using a unitary modeling language (UML).

According to one embodiment of the present invention, the obtaining module 2302 comprises: an obtaining module configured to obtain a change set in response to a change in the source code.

According to one embodiment of the present invention, the obtaining module configured to obtain a change set in response to a change in the source code comprises: an obtaining module configured to obtain, using a comparing tool, the change set as compared to previously stored source code in response to the change in the source code.

According to one embodiment of the present invention, the obtaining module 2302 comprises: an analyzing module configured to analyze a change set to obtain test cases for the change.

According to one embodiment of the present invention, the analyzing module configured to analyze a change set to obtain test cases for the change comprises: an obtaining module configured to obtain based on the mapping a first test case mapped to a function in response to the change occurring in the function.

According to one embodiment of the present invention, the obtaining module configured to obtain based on the mapping a first test case mapped into a function in response to the change occurring in the function comprises: an obtaining module configured to obtain changed filed names and line number of the source code based on the change set; a searching module configured to search for a mapping table created between the source code and test cases using the file names and line numbers to obtain the changed function names and class names; and a searching module configured to search for test case names simultaneously corresponding to the file names, the function names and the class names in the mapping table to obtain the first test case.

According to one embodiment of the present invention, the analyzing module configured to analyze the change set to obtain test cases for the change comprises: an obtaining module configured to obtain a second test case mapped into a class based on the mapping in response to the change occurring in the class.

According to one embodiment of the present invention, the obtaining module configured to obtain based on the mapping a second test case mapped into a class in response to the change occurring in a class comprises: an obtaining module configured to obtain file names and line numbers of the source code based on the change set in response to a change in the source code; a searching module configured to search for a mapping table created between the source code and test cases using the file numbers and line numbers to obtain the changed class names; and a searching module configured to search for test case names simultaneously corresponding to the file names and the class names in the mapping table to obtain the second test case.

According to one embodiment of the present invention, it further comprises: a running module configured to run a union set between the first test case and the second test case.

It should be appreciated that the above mentioned device and means of the present invention may be realized through hardware, software or combination of software and hardware. Wherein, a hardware portion may be realized using a dedicated logic; a software portion may be stored in a memory, and a system is executed through proper instructions, for example, executed by a microprocessor or dedicated hardware. Those skilled in the art may understand that the foregoing method and system may be realized using a computer executable instruction and/or being included in processor control code. For example, such code is provided on a carrier medium like a disk, CD or DVD-ROM, a programmable memory like a read-only memory (firmware) or a data carrier like an optical or electrical signal carrier. The device and means of the embodiments of the present invention may be realized by VLSI or a gate array, a semiconductor like a logic chip, a transistor, etc., or a hardware circuit of a programmable hardware device like field programmable gate array, a programmable logic device, etc., or by for example software executed by processors of various types, or by combination of the hardware circuit and software (e.g., firmware).

It should be noted that, though the preceding detailed description includes several means or sub-means of the device, the division is only used exemplarily but not restrictively. As a matter of fact, according to embodiments of the present disclosure, features and functions of two or more means as described above may be embodied in one means. On the contrary, features and function of one means as described above may be further embodied by a plurality of means.

The present invention further provides a computer program product, comprising a computer readable program instruction embodied therein, which causes a processor to perform the above method when the computer readable program instruction is being executed by the processor.

Under the teaching given in the description and relevant figures, modifications and other embodiments of the present invention will be appreciated by those skilled in the relevant field. Hence, it should be understood that the embodiments of the present invention are not limited to the disclosed specific embodiments, and modifications and other embodiments intend to be covered in the range of the present invention. Moreover, though the above description and relevant figures describe exemplary embodiments in a background of certain exemplary combinations of components and/or functions, it should be realized that alternative embodiments can provide different combinations of components and/or functions without departing from the scope of the present disclosure. Regarding this, for example, other combination of components and/or functions being somewhat different from the above explicit description also falls into the scope of the present invention. Although particular terms are used herein, they are used only in their general and descriptive senses, without a purpose of limiting.

What is claimed is:

1. A method for testing a software program, comprising:

creating a mapping table expressing a mapping between source code of the software program and test cases based on code coverage, wherein the source code is stored within a source code repository on a data storage system and the source code includes classes and functions, each class including one or more of the functions, the mapping table including a plurality of mapping entries each associating a respective test with a corresponding function and a corresponding class that includes the function;

in response to a change in the source code, obtaining a test case for the change based on the mapping in the mapping table, wherein the test case is selected from a plurality of test cases available to test the source code by (1) in a first case in which a function has changed, obtaining a first test case based on a first association of the first test case with the function in the mapping table, and (2) in a second case in which a class including the function has changed, obtaining a second test case based on a second association of the second test case with the class in the mapping table; and executing the software program according to the obtained test case to test the change in the source code, wherein the function is a first function and the first association associates the first test case with both the first function and the class, and wherein the mapping table includes one or more additional entries making a second association between the second test case, the class, and a second function of the class, such that selection of the second test case includes coverage of the class but not of the first function of the class.

2. The method according to claim 1, wherein the creating a mapping between source code and test cases based on a code coverage comprises:

generating a run report after running the test cases on the source code using a code coverage tool; and obtaining a mapping between the source code and the test cases based on the run report.

3. The method according to claim 2, wherein the generating a run report after running the test cases on the source code using a code coverage tool comprises:

after running each of the test cases on the source code, generating the run report for each of the test cases using the code coverage tool.

4. The method according to claim 2, wherein the obtaining a mapping between the source code and the test cases based on the run report comprises:

creating, based on the run report, mapping tables between the test cases and line numbers, function names, class names and file names in the source code.

5. The method according to claim 4, wherein the creating the mapping tables comprises:

performing information extraction on the run report generated after running each of the test cases to obtain a mapping table between each of the tests case and corresponding line numbers, function names, class names and file names in the source code.

6. The method according to claim 5, wherein the obtaining a mapping table between each of the test cases and corresponding line numbers, function names, class names and file names in the source code comprises:
   reading the run report to obtain the line numbers, function names, class names and file names of the source code; and
   storing each of the test cases and the obtained line numbers, function names, class names and file names into a mapping table of a database.

7. The method according to claim 1, wherein the creating mapping between source code and the test cases based on a code coverage comprises:
   performing test cases in a test case repository for the source code to obtain the code coverage.

8. A computer-implemented device, comprising:
   memory storing instructions; and
   a processor coupled to the memory and operative to execute the instructions to form functional modules collectively operative to test a software program, the modules including:
   a creating module configured to create a mapping table expressing a mapping between source code of the software program and test cases based on code coverage, wherein the source code is stored within a source code repository on a data storage system and the source code includes classes and functions, each class including one or more of the functions, the mapping table including a plurality of mapping entries each associating a respective test with a corresponding function and a corresponding class that includes the function;
   an obtaining module configured to, in response to a change in the source code, obtain a test case for the change based on the mapping in the mapping table, wherein the test case is selected from a plurality of test cases available to test the source code, by (1) in a first case in which a function has changed, obtaining a first test case based on a first association of the first test case with the function in the mapping table, and (2) in a second case in which a class including the function has changed, obtaining a second test case based on a second association of the second test case with the class in the mapping table;
   wherein the device is enabled to execute the software program according to the obtained test case to test the change in the source code,
   and wherein the function is a first function and the first association associates the first test case with both the first function and the class, and wherein the mapping table includes one or more additional entries making a second association between the second test case, the class, and a second function of the class, such that selection of the second test case includes coverage of the class but not of the first function of the class.

9. The device according to claim 8, wherein the creating module comprises:
   a generating module configured to generate a run report after running the test cases on the source code using a code coverage tool; and
   an obtaining module configured to obtain a mapping between the source code and the test cases based on the run report.

10. The device according to claim 9, wherein the generating module configured to generate a run report after running the test cases on the source code using a code coverage tool comprises:
    a generating module configured to generate a run report for each of the test cases using the code coverage tool after running each of the test cases on the source code.

11. The device according to claim 9, wherein the obtaining module configured to obtain mapping between the source code and the test cases based on the run report comprises:
    a creating module configured to create based on the run report a mapping table between the test cases and line numbers, function names, class names and file names in the source code.

12. The device according to claim 11, wherein the creating module configured to create based on the run report a mapping table between the test cases and line numbers, function names, class names and file names in the source code comprises:
    a performing module configured to perform information extraction on a run report generated after running each of the test cases to obtain a mapping table between each of the test cases and corresponding line numbers, function names, class names and file names in the source code.

13. The device according to claim 12, wherein the performing module configured to perform information extraction on a run report generated after running each of the test cases to obtain a mapping table between each of the test cases and corresponding line numbers, function names, class names and file names in the source code comprises:
    a reading module configured to read the run report to obtain the line numbers, function names, class names and file names of the source code; and
    a storing module configured to store each of the test cases and the obtained line numbers, function names, class names and file names into a mapping table of a database.

14. The device according to claim 8, wherein the creating module comprises:
    an executing module configured to execute all test cases in a test case repository for the source code to obtain the code coverage.

15. The device according to claim 14, wherein the executing module configured to execute all test cases in a test case repository for the source code to obtain the code coverage comprises:
    an adding module configured to add a new test case into the test case repository for an uncovered part of the source code, if the test cases in the test case repository fail to cover the source code.

16. The device according to claim 8, wherein the creating module comprises:
    a storing module configured to store the mapping in a database modeled using a unitary modeling language.

17. A computer program product, comprising:
    a non-transitory computer readable medium encoded with computer-executable code for testing a software program, wherein the code is configured to enable the execution of:
    creating a mapping table expressing a mapping between source code of the software program and test cases based on code coverage, wherein the source code is stored within a source code repository on a data storage system and the source code includes classes and functions, each class including one or more of the functions, the mapping table including a plurality of mapping entries each associating a respective test with a corresponding function and a corresponding class that includes the function;

in response to a change in the source code, obtaining a test case for the change based on the mapping in the mapping table, wherein the test case is selected from a plurality of test cases available to test the source code, by (1) in a first case in which a function has changed, obtaining a first test case based on a first association of the first test case with the function in the mapping table, and (2) in a second case in which a class including the function has changed, obtaining a second test case based on a second association of the second test case with the class in the mapping table; and executing the software program according to the obtained test case to test the change in the source code, wherein the function is a first function and the first association associates the first test case with both the first function and the class, and wherein the mapping table includes one or more additional entries making a second association between the second test case, the class, and a second function of the class, such that selection of the second test case includes coverage of the class but not of the first function of the class.

18. The method according to claim 17, wherein the creating a mapping between source code and test cases based on a code coverage comprises:

generating a run report after running the test cases on the source code using a code coverage tool; and obtaining a mapping between the source code and the test cases based on the run report.

19. The method according to claim 18, wherein the generating a run report after running the test cases on the source code using a code coverage tool comprises:

after running each of the test cases on the source code, generating the run report for each of the test cases using the code coverage tool.

20. The method according to claim 18, wherein the obtaining a mapping between the source code and the test cases based on the run report comprises:

creating, based on the run report, mapping tables between the test cases and line numbers, function names, class names and file names in the source code.

\* \* \* \* \*